J. SCHUTTE.
DRIVING MECHANISM FOR AIRSHIPS.
APPLICATION FILED JULY 2, 1909.
987,178.
Patented Mar. 21, 1911.
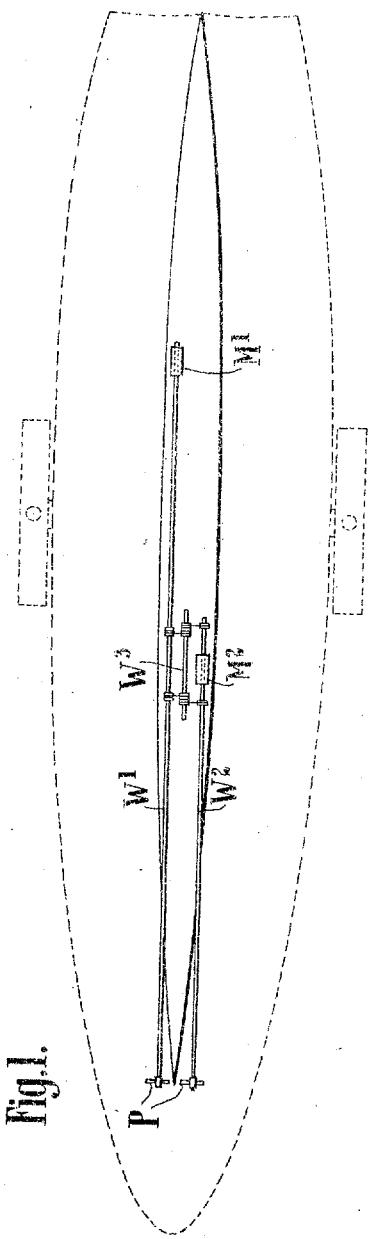
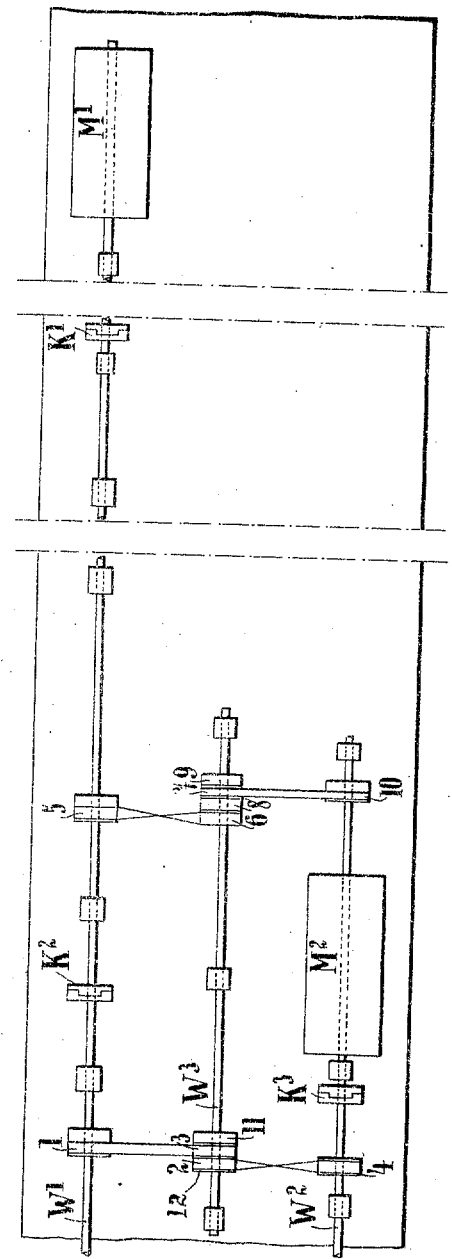
Witnesses.
Inventor.
Johann Schütte

UNITED STATES PATENT OFFICE.

JOHANN SCHÜTTE, OF LANGFUHR, NEAR DANZIG, GERMANY.

DRIVING MECHANISM FOR AIRSHIPS.

987,178. Specification of Letters Patent. Patented Mar. 21, 1911.

Application filed July 2, 1909. Serial No. 505,694.

*To all whom it may concern:*

Be it known that I, JOHANN SCHÜTTE, a subject of the King of Prussia, residing at 47ʰ Jäschkenthalerweg, Langfuhr, near Danzig, Germany, have invented certain new and useful Improvements in Driving Mechanisms for Airships; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to driving mechanism for air-ships, and has for its object to provide a mechanism for driving a plurality of shafts in unison, by means of a motor on each shaft, together with means for driving the shafts either in the same direction or in opposite directions, from any one of the motors, in case any of the motors become inoperative from any reason whatever, and details of construction hereinafter more particularly described and claimed.

Referring to the drawings, in which like parts are similarly designated—Figure 1 shows a plan view of an air-ship car with the balloon shown in dotted lines. Fig. 2 is an enlarged detail view showing the mechanism for driving two parallel shafts.

$W^1$, $W^2$ are the driving shafts for the propellers P, each of which shafts is driven by a pertaining motor $M^1$ and $M^2$ respectively. The two shafts $W^1$ and $W^2$ are normally driven by the motors $M^1$ and $M^2$ in opposite directions.

$W^3$ is a shaft located between the two shafts $W^1$ and $W^2$ and carries fixed belt pulleys 12, 8 and 9, and loose belt pulleys 6, 7 and 11. The shaft $W^1$ carries two fixed belt pulleys 1 and 5, and the shaft $W^2$ carries two fixed belt pulleys 4 and 10. The belt pulley 4 is belted by a crossed belt to the part 2 of the belt pulley 12 of the intermediate shaft $W^3$. The part 3 of the belt pulley 12 is belted by an uncrossed belt to the belt pulley 1 on the shaft $W^1$; the loose belt pulley 11 is adjacent to the pulley 12. The belt pulley 5 is connected by a crossed belt to loose belt pulley 6 and the loose belt pulley 7 is connected by an uncrossed belt to the belt pulley 10. The belt pulley 8 secured to the shaft $W^3$, lies between the loose belt pulleys 6 and 7, and the belt pulley 9, also fixed on shaft $W^3$, lies adjacent the loose belt pulley 7.

$K^1$ and $K^2$ are couplings for the shaft $W^1$, and $K^3$ is a coupling for the shaft $W^2$, both of these shafts being in sections, and coupled together by said couplings. Should it be desired to reverse the rotation of the propellers P, the couplings $K^2$ and $K^3$ are disengaged, and the crossed belt is shifted from loose pulley 6 to fixed pulley 8, and the uncrossed belt is shifted from the loose pulley 7 to fixed pulley 9. The two motors $M^1$ and $M^2$ thereby drive the pulleys 10 and 5 to uniformly drive the shaft $W^3$ which drives the propeller shaft sections rearwardly of the couplings $K^2$ and $K^3$ by means of the part 2 of the pulley 12 and the pulley 4, on the one hand, and by means of the part 3 of the pulley 12 and pulley 1 on the other hand. Should it be desired that one of the screws be reversed while the other is not reversed, then, for example, the coupling $K^3$ is disengaged and the uncrossed belt is shifted from pulley 3 to loose pulley 11 and the crossed belt is shifted from pulley 6 to the fixed pulley 8. Thus it will be seen that the entire machine is under absolute control, by controlling the shifting of three belts, namely, the belt of pulley 3, the crossed belt of pulley 6 and the uncrossed belt of pulley 7.

It is, of course, obvious that a rope drivage may be substituted for the belt drivage.

I claim—

1. In an air-ship, the combination with two screw-propeller shafts and a motor to drive each of them, said shafts composed of sections and means to couple and uncouple said sections; of a third shaft between the propeller shafts, a pair of belt pulleys on each propeller shaft and three loose and three fixed pulleys on the intermediate shaft, a crossed and an uncrossed belt connection between each motor shaft and the intermediate shaft, whereby each motor may drive both shafts in the same direction or in opposite directions.

2. In an air-ship, the combination with the screw-propeller shafts and a motor to drive each of them, said shafts composed of sections, and means to couple the sections; of a third shaft between the propeller shafts, the rear section of one propeller shaft belted by an uncrossed belt to the intermediate shaft and the other section of said propeller shaft belted by a crossed belt to the intermediate shaft, the sections of the other propeller shaft being connected to the intermediate shaft in a reverse manner.

3. In an air ship, the combination with two parallel propeller shafts each composed of two sections, a motor connected with each shaft, and means to couple and uncouple each section, of a third shaft between the propeller shafts, one fixed pulley on each of said sections, three fixed and three loose pulleys on the intermediate shaft, one of the fixed pulleys and one of the loose pulleys on the intermediate shaft being belted to different sections of one of the propeller shafts by an uncrossed belt and a cross belt respectively, said fixed pulley being belted by a cross-belt to a pulley on one section of the other propeller shaft, and another one of said loose pulleys on the intermediate shaft being belted by an uncrossed belt to another section of the last named propeller shaft, whereby each motor or both motors may drive both shafts in the same direction forward or rearward or in opposite directions.

In testimony that I claim the foregoing as my invention, I have signed my name in presence of two subscribing witnesses.

JOHANN SCHÜTTE.

Witnesses:
PROF. ZUHNER,
KARL WALTHER.